United States Patent [19]

Oikawa et al.

[11] Patent Number: 5,286,840
[45] Date of Patent: Feb. 15, 1994

[54] THERMALLY STABLE POLYIMIDE AND PREPARATION PROCESS OF POLYIMIDE

[75] Inventors: Hideaki Oikawa; Nobuhito Koga; Akihiro Yamaguchi; Shoji Tamai, all of Kanagawa, Japan

[73] Assignee: Mitsui Toatsu Chemicals, Inc., Tokyo, Japan

[21] Appl. No.: 795,750

[22] Filed: Nov. 21, 1991

[30] Foreign Application Priority Data

Nov. 28, 1990 [JP] Japan .................................. 2-323074

[51] Int. Cl.$^5$ ...................... C08G 69/26; C08G 73/10
[52] U.S. Cl. .................................... 528/353; 528/125; 528/126; 528/128; 528/170; 528/172; 528/179; 528/188; 528/207; 528/208; 528/222; 528/229; 528/317; 528/322; 528/351; 528/352
[58] Field of Search ............... 528/125, 126, 128, 170, 528/172, 179, 188, 207, 208, 222, 229, 317, 322, 351, 352, 353

[56] References Cited

U.S. PATENT DOCUMENTS

| | | |
|---|---|---|
| 3,959,350 | 5/1976 | Rogers ................................. 528/353 |
| 3,998,786 | 12/1976 | D'Alelio ............................. 528/125 |
| 4,742,153 | 5/1988 | Sutton, Jr. ......................... 528/353 |

FOREIGN PATENT DOCUMENTS

| | | |
|---|---|---|
| 179604 | 4/1986 | European Pat. Off. . |
| 200204 | 11/1986 | European Pat. Off. . |
| 395020 | 10/1990 | European Pat. Off. . |
| 2-60931 | 3/1990 | Japan . |
| 2-60932 | 3/1990 | Japan . |

Primary Examiner—John Kight, III
Assistant Examiner—Shelley A. Dodson
Attorney, Agent, or Firm—Burns, Doane, Swecker & Mathis

[57] ABSTRACT

A thermally stable polyimide which is blocked at the polymer terminal with a dicarboxylic acid anhydride represented by the formula (III):

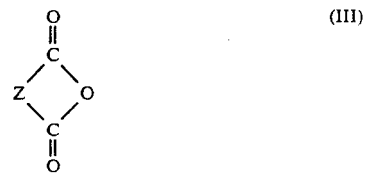

wherein Z is a divalent radical selected from the group consisting of a monoaromatic radical which is substantially unsubstituted or substituted with a radical having no reactivity with amine or dicarboxylic acid anhydride and has from 6 to 15 carbon atoms, a condensed polyaromatic radical or a noncondensed aromatic radical connected each other with a direct bond or a bridge member, and has a fundamental skeleton represented by recurring structural units of the formula (IV):

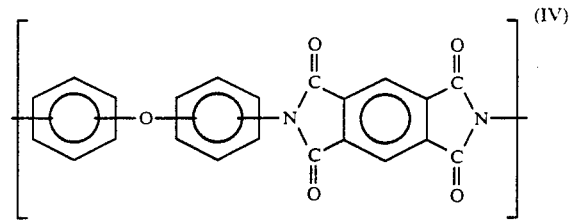

and a process of preparing the polyimide.

2 Claims, 1 Drawing Sheet

THERMALLY STABLE POLYIMIDE AND PREPARATION PROCESS OF POLYIMIDE

BACKGROUND OF THE INVENTION

1. Field of the Invention

The present invention relates to polyimide resin and particularly relates to a thermally stable polyimide and a process of preparing the polyimide.

2. Description of the Related Art

Conventionally, polyimide obtained by reaction of tetracarboxylic acid dianhydride with diamine is excellent in mechanical strength and dimensional stability in addition to its high heat resistance and flame retardance and electrical insulation property.

Because of these preferred properties, polyimide has been used in various fields such as electric and electronic appliance, space and aeronautic equipment, and transfer machinery. Polyimide is hence expected to be widely used in fields where heat resistance is required.

For example, polyimide having a fundamental skeleton of the following formula (V):

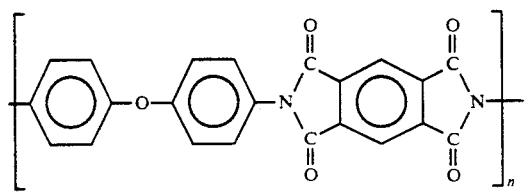

(V)

has been widely used in the form of films and molded materials due to its excellent heat resistance, and mechanical and electrical properties. However, polyimide has a disadvantage that continuous use of the polyimide for a long time at high temperature in air leads to gradual reduction of these excellent properties and impairs essential properties of the polyimide.

Attempts have also been carried out to improve properties by blocking the polymer terminal of the polyimide having the fundamental skeleton of the formula (V). For example, Japanese Laid-Open Patent HEI 2-60931 and 2-60932 (1990) have disclosed polyimide and its precursor polyamic acid which have been blocked with a monoamine such as p-fluoroaniline in order to improve alkali resistance. U.S. Pat. No. 4,742,153 has also disclosed blocking the polyamic acid precursor of the formula (V) with pyromellitic anhydride. The invention, however, relates to a process for carrying out, in a drying step after blocking, solvent removal, imidization and simultaneous high polymer formulation of polyimide by intermolecular reaction of terminal carboxylic acid and terminal amine. That is, the invention relates to thermosetting polyimide.

Consequently, it has not been investigated to block the polymer terminal of polyimide having the formula (V) with dicarboxylic acid anhydride in order to improve thermal stability at high temperature.

SUMMARY OF THE INVENTION

An object of the present invention is to provide polyimide which is, in addition to its substantially outstanding properties, excellent in mechanical property and thermal-oxidative stability and further does not deteriorate in properties even after being retained at high temperatures for a long time in air.

The present inventors have carried out an intensive investigation in order to accomplish the object. As a result, they have found that the polyimide obtained by blocking the polymer terminal of polyimide having recurring structural units of the formula (V) with dicarboxylic acid anhydride has excellent thermal-oxidative stability. Thus, the present invention has been completed.

One aspect of the invention is (1) a thermally stable polyimide which is blocked at the polymer terminal with dicarboxylic acid anhydride represented by the formula (III)

(III)

wherein Z is a divalent radical selected from the group consisting of a monoaromatic radical which is substantially unsubstituted or substituted with a radical having no reactivity with amine or carboxylic and anhydride and has from 6 to 15 carbon atoms, a condensed polyaromatic radical or a noncondensed aromatic radical connected each other with a direct bond or a bridge member, and essentially consists of recurring structural units of the formula (IV):

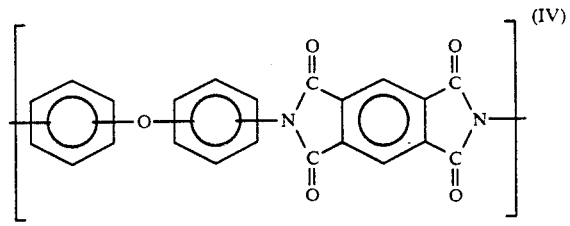

(IV)

Another aspect of the invention is (2) a process of preparing polyimide by reacting a diamine compound and a tetracarboxylic acid dianhydride and thermally or chemically imidizing the resultant polyamic acid comprising the steps of reacting (a), as a diamine compound, 1 mole of a diaminodiphenyl ether represented by the formula

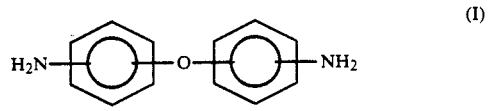

(I)

with (b), as a tetracarboxylic acid dianhydride, from 0.9 to 1.0 mole of pyromellitic dianhydride of the formula (II):

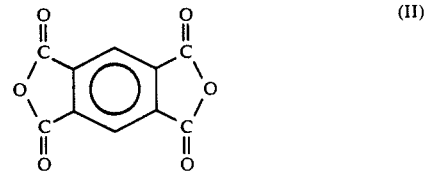

(II)

in the presence of (c) from 0.001 to 1.0 mole of a dicarboxylic acid anhydride represented by the formula (III):

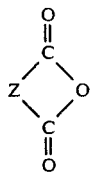
(III)

wherein Z is the same as above; or (3) a process of preparing polyimide comprising the steps of reacting 1 mole of a diaminodiphenyl ether of the above formula (I) with from 0.9 to 1.0 mole of tetracarboxylic acid dianhydride of the formula (II) to obtain polyamic acid having amino radicals derived from diaminodiphenyl ether at the polymer terminal and successively blocking the polymer terminal by reacting the polyamic acid with from 0.001 to 1.0 mole of dicarboxylic acid anhydride of the formula (III):

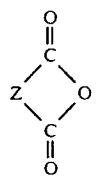
(III)

wherein Z is the same as above, for 1 mole of the above diamine compound; to prepare a thermally stable polyimide being blocked at the polymer terminal with dicarboxylic acid anhydride and having a fundamental skeleton essentially consisting of recurring structural units represented by the formula (IV):

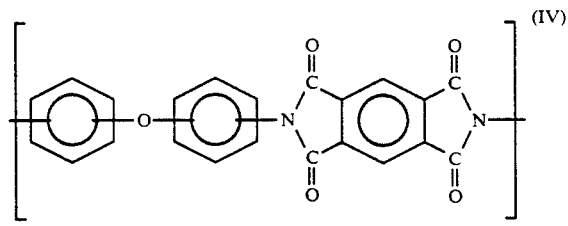
(IV)

The present invention can provide an excellent polyimide which is outstanding in mechanical property, thermal property, electrical property and solvent resistance and is stable at high temperatures for a long time.

DETAILED DESCRIPTION OF THE INVENTION

Figure 1:
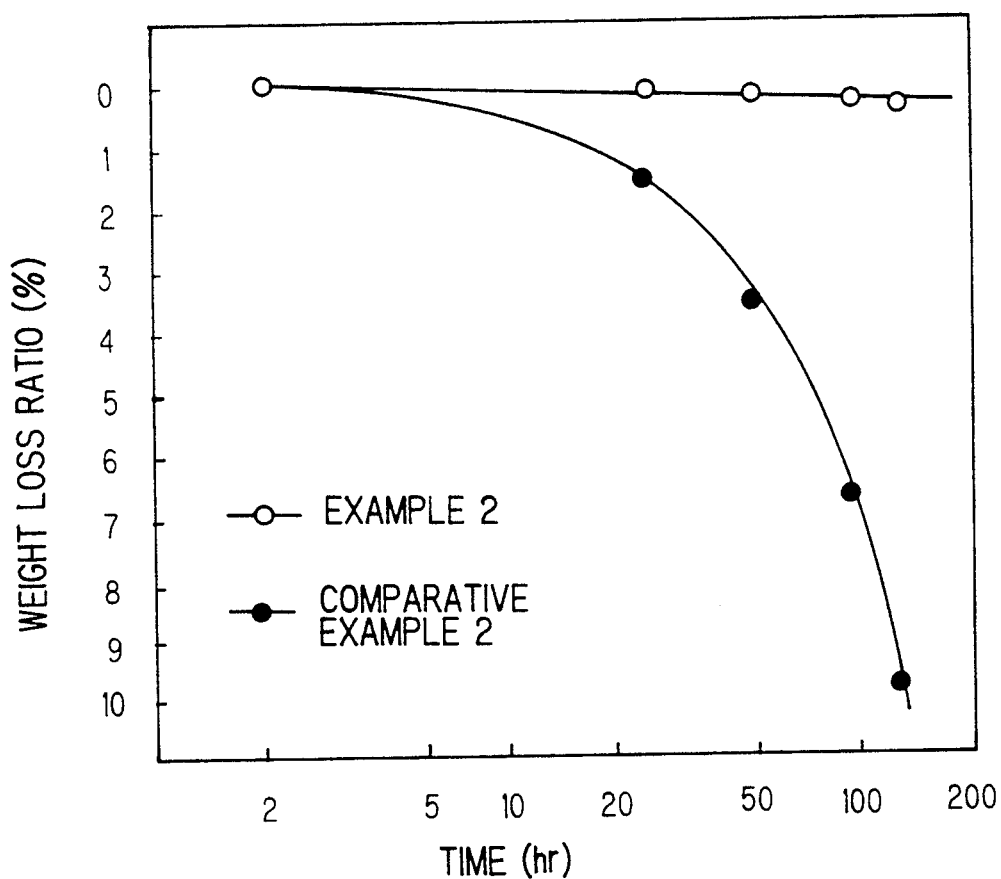
FIG. 1 illustrates time-dependent variation of an isothermal weight loss ratio in the air of the polyimide powder obtained in Example 2 and Comparative Example 2.

The polyimide of the invention has a fundamental skeleton essentially consisting of recurring structural units of the formula (IV):

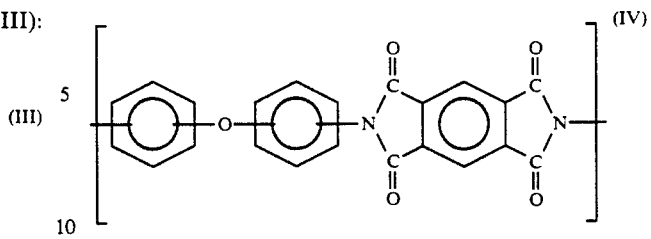
(IV)

and is blocked at the polymer terminal with dicarboxylic acid anhydride represented by the formula (III):

(III)

wherein Z is a divalent radical selected from the group consisting of a monoaromatic radical which is substantially unsubstituted or substituted with a radical having no reactivity with amine or carboxylic acid anhydride and has from 6 to 15 carbon atoms, a condensed polyaromatic radical or a noncondensed aromatic radical connected each other with a direct bond or a bridge member.

The polyimide of the invention is prepared by the following process which will be illustrated in detail.

The diamine compounds for use in the invention are diaminodiphenyl ethers represented by the above formula (I) and include, for example,
4,4'-diaminodiphenyl ether,
3,4'-diaminodiphenyl ether,
3,3'-diaminodiphenyl ether,
2,4'-diaminodiphenyl ether,
2,3'-diaminodiphenyl ether, and
2,2'-diaminodiphenyl ether.
These diaminodiphenyl ethers are used singly or as a mixture.

A part of the above diamine compounds can be replaced by other diamine compounds as long as imparting no adverse effect on the good properties of the polyimide in the invention.

Exemplary other diamine compounds which can be used include, m-phenylenediamine, o-phenylenediamine, p-phenylenediamine, m-aminobenzylamine, p-aminobenzylamine,
bis(3-aminophenyl) sulfide,
(3-aminophenyl)(4-aminophenyl) sulfide,
bis(4-aminophenyl) sulfide,
bis(3-aminophenyl) sulfoxide,
(3-aminophenyl)(4-aminophenyl) sulfoxide,
bis(4-aminophenyl) sulfoxide,
bis(3-aminophenyl) sulfone,
(3-aminophenyl)(4-aminophenyl) sulfone,
bis(4-aminophenyl) sulfone,
3,3'-diaminobenzophenoe, 3,4'-diaminobenzophenone,
4,4'-diaminobenzophenone,
bis{4-(4-aminophenoxy) phenyl}methane,
1,1-bis{4-(4-aminophenoxy)phenyl}ethane,
1,2-bis{4-(4-aminophenoxy)phenyl}ethane,
1,2-bis{4-(3-aminophenoxy)phenyl}ethane,
2,2-bis{4-(4-aminophenoxy)phenyl}propane,
2,2-bis{4-(4-aminophenoxy)phenyl}butane, 2,2-bis{4-(4-aminophenoxy)phenyl}-1,1,1,3,3,3-hexafluoropropane,
1,3-bis{3-aminophenoxy)benzene,
1,3-bis{4-aminophenoxy)benzene,
1,4-bis{3-aminophenoxy)benzene,
1,4-bis{4-aminophenoxy)benzene,
4,4'-bis{4-aminophenoxy)biphenyl,
bis{4-(4-aminophenoxy)phenyl}ketone,
bis{4-(4-aminophenoxy)phenyl}sulfide,
bis{4-(4-aminophenoxy)phenyl}sulfoxide,
bis{4-(4-aminophenoxy)phenyl}sulfone,
bis{4-(3-aminophenoxy)phenyl}ether,
bis{4-(4-aminophenoxy)phenyl}ether,
1,4-bis{4-(3-aminophenoxy) benzoyl}benzene,
1,3-bis{4-(3-aminophenoxy) benzoyl}benzene,
bis{4-(3-aminophenoxy) benzoyl}methane,
1,1-bis{4-(3-aminophenoxy)phenyl}ethane,
2,2-bis{4-(3-aminophenoxy)phenyl}propane,
2-{4-(3-aminophenoxy)phenyl}-2-{4-(3-aminophenoxy)-3-methylphenyl}propane, propane,
2,2-bis{4-(3-aminophenoxy)-3-methylphenyl }propane,
2-{4-(3-aminophenoxy)phenyl}-2- {4-(3-aminophenoxy)-3,5-dimethylphenyl}propane,
2,2-bis{4-(3-aminophenoxy)-3.5-dimethylphenyl}propane,
2,2-bis{4-(3-aminophenoxy)phenyl}butane,
2,2-bis{4-(3-aminophenoxy)phenyl}-1,1,1,3,3,3-hexafluoropropane,
4,4'-bis(3-aminophenoxy)biphenyl,
4,4'-bis(3-aminophenoxy)-3-methylbiphenyl,
4,4'-bis(3-aminophenoxy)-3,3'-dimethylbiphenyl,
4,4'-bis(3-aminophenoxy)-3,5-dimethylbiphenyl,
4,4'-bis(3-aminophenoxy)-3,3',5,5'-tetramethylbiphenyl,
4,4'-bis(3-aminophenoxy)-3,3'-dichlorobiphenyl,
4,4'-bis(3-aminophenoxy)-3,5'-dichlorobiphenyl,
4,4'-bis(3-aminophenoxy)-3,3',5,5'-tetrachlorobiphenyl,
4,4'-bis(3-aminophenoxy)-3,3'-dibromobiphenyl,
4,4'-bis(3-aminophenoxy)-3,5'-dibromobiphenyl,
4,4'-bis(3-aminophenoxy)-3,3',5,5'-tetrachlorobiphenyl,
bis{4-(3-aminophenoxy)phenyl}ketone,
bis{4-(3-aminophenoxy)phenyl}sulfide,
bis{4-(3-aminophenoxy)-3-methoxyphenyl}sulfide,
{4-(3-aminophenoxy)phenyl}{4-(3-aminophenoxy)-3,5-dimethoxyphenyl}sulfide,
bis{4-(3-aminophenoxy)-3,5-diethoxyphenyl}sulfide, and
bis{4-(3-aminophenoxy)phenyl}sulfone. These other diamine compounds can be used singly or as a mixture.

The tetracarboxylic acid dianhydride used in the invention is pyromellitic dianhydride.

Other tetracarboxylic acid dianhydrides can be used as a mixture with pyromellitic dianhydride unless the good properties of the polyimide of the invention are impaired.

Exemplary other tetracarboxylic acid dianhydrides which can be used include a single compound or a mixture of compounds selected
from ethylenetetracarboxylic dianhydride,
butanetetracarboxylic dianhydride,
cyclopentanetetracarboxylic dianhydride,
3,3',4,4'-benzophenonetetracarboxylic dianhydride,
2,2',3,3'-benzophenonetetracarboxylic dianhydride,
3,3',4,4'-biphenyltetracarboxylic dianhydride,
2,2',3,3'-biphenyltetracarboxylic dianhydride,
2,2-bis(3-4-dicarboxyphenyl)propane dianhydride,
2,2-bis(2,3-dicarboxyphenyl)propane dianhydride,
2,2-bis(3,4-dicarboxyphenyl)-1,1,1,3,3,3-hexafluoropropane dianhydride,
2,2-bis(2,3-dicarboxyphenyl)-1,1,1,3,3,3-hexafluoropropane dianhydride,
bis(3,4-dicarboxyphenyl) ether dianhydride,
bis(2,3-dicarboxyphenyl) ether dianhydride,
bis(3,4-dicarboxyphenyl) sulfone dianhydride,
bis(2,3-dicarboxyphenyl) sulfone dianhydride,
1,1-bis(2,3-dicarboxyphenyl)ethane dianhydride,
bis(2,3-dicarboxyphenyl)methane dianhydride,
bis(3,4-dicarboxyphenyl)methane dianhydride,
4,4'-(p-phenylenedioxy)diphthalic dianhydride,
4,4'-(m-phenylenedioxy)diphthalic dianhydride,
2,3,6,7-naphthalenetetracarboxylic dianhydride,
1,4,5,8-naphthalenetetracarboxylic dianhydride,
1,2,5,6-naphthalenetetracarboxylic dianhydride,
1,2,3,4-benzenetetracarboxylic dianhydride,
3,4,9,10-perylenetetracarboxylic dianhydride,
2,3,6,7-anthracenetetracarboxylic dianhydride and
1,2,7,8-phenanthrenetetracarboxylic dianhydride.

The dicarboxylic acid anhydrides of the formula (III) which can be used in the invention include, for example, a compound or a mixture of the compound selected from phthalic anhydride,
2,3-benzophenonedicarboxylic anhydride,
3,4-benzophenonedicarboxylic anhydride,
2,3-dicarboxyphenyl phenyl ether anhydride,
3,4-dicarboxyphenyl phenyl ether anhydride,
2,3-biphenyldicarboxylic anhydride,
3,4-biphenyldicarboxylic anhydride,
2,3-dicarboxyphenyl phenyl sulfone anhydride,
3,4-dicarboxyphenyl phenyl sulfone anhydride,
2,3-dicarboxyphenyl phenyl sulfide anhydride,
3,4-dicarboxyphenyl phenyl sulfide anhydride,
1,2-naphthalenedicarboxylic anhydride,
2,3-naphthalenedicarboxylic anhydride,
1,8-naphthalenedicarboxylic anhydride,
1,2-anthracenedicarboxylic anhydride,
2,3-anthracenedicarboxylic anhydride and
1,9-anthracenedicarboxylic anhydride.

The amounts of the diamine compound, tetracarboxylic acid dianhydride and dicarboxylic acid anhydride are 0.9 to 1.0 mole of tetracarboxylic acid dianhydride and 0.001 to 1.0 mole of dicarboxylic acid anhydride per mole of the diamine compound.

When the amount of dicarboxylic acid anhydride is less than 0.001 mole, heat stability of the polyimide at high temperature which is the object of the invention cannot be obtained. On the other hand, an amount exceeding 1.0 mole decreases mechanical properties. Thus, a preferred amount is in the range of 0.01 to 0.5 mole per mole of the diamine compound.

The reaction of the invention is carried out in an organic solvents. Exemplary organic solvents which can be used include, for example,
N,N-dimethylformamide, N,N-dimethylacetamide,
N,N-dimethylmethoxyacetamide, N-methyl-2-pyrrolidone,
1,3-dimethyl-2-imidazolidinone, N-methylcaprolactone,
1,2-dimethoxyethane, bis(2-methoxyethyl) ether,
1,2-bis(2-methoxyethoxy)ethane,
bis{2-(2-methoxyethoxy)ethyl}ether, tetrahydrofuran, 1,3-dioxane, 1,4-dioxane, pyridine, picoline, dimethyl sulfoxide, dimethyl sulfone, tetramethylurea, hexamethylphosphoramide, phenol, m-cresol, o-cresol, p-cresol, chlorophenol and anisole.

The organic solvent can be used singly or as a mixture.

In the practice of the invention, the starting material diaminodiphenyl ether reacts with pyromellitic dianhydride in the presence of dicarboxylic acid anhydride to obtain the desired polyimide.

Any of the following procedures can be conducted for the reaction.

(a) After reacting diaminodiphenyl ether with pyromellitic dianhydride, dicarboxylic acid anhydride is added and the reaction is continued.

(b) After reacting diaminodiphenyl ether with dicarboxylic acid anhydride, pyromellitic dianhydride is added and the reaction is further continued.

(c) Pyromellitic dianhydride and dicarboxylic acid anhydride are added to diaminodiphenyl ether at the same time, and the reaction is carried out.

(d) After sufficiently reacting diaminodiphenyl ether with pyromellitic dianhydride, diaminodiphenyl ether is added again and thereafter the reaction is conducted with dicarboxylic acid anhydride.

The reaction temperature is from 0° to 250° C., usually 60° C. or less.

No particular limitation is imposed upon the reaction pressure and atmospheric pressure is sufficient to carry out the reaction.

Reaction time varies depending upon diaminodiphenyl ether, pyromellitic dianhydride, dicarboxylic acid anhydride, the kind of solvent and the reaction temperature, and is usually 4 to 24 hours to complete the reaction.

The reaction forms polyamic acid having a fundamental skeleton represented by recurring structural units of the formula (VI):

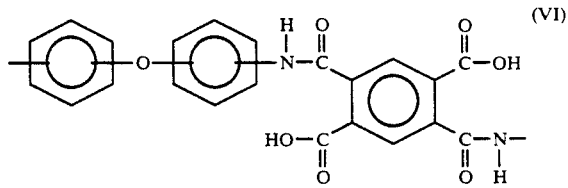

The polyamic acid is heat-dehydrated at 100° to 400° C. or chemically imidized by using common imidizing agents such as triethylamine and acetic anhydride to give polyimide having the corresponding fundamental skeleton represented by recurring structural units of the formula (IV):

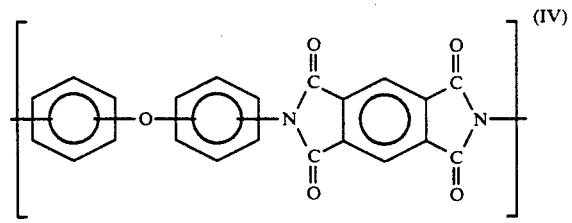

Polyamic acid is generally formed at relatively low temperatures and imidized thermally or chemically. Polyimide, however, can also be obtained by simultaneously carrying out formation and thermal imidization of the polyamic acid at the temperature of 60° to 250° C. The above procedures for addition and reaction of dicarboxylic acid anhydride can be employed in polyamic acid formation and conversion to polyimide.

For example, in the above procedure (a) for preparing the polyimide of the invention which has the above recurring structural units and is blocked at the polymer terminal with a dicarboxylic acid anhydride, diaminodiphenyl ether and pyromellitic dianhydride are reacted in the above mole ratio to form polyamic acid which has the fundamental skeleton represented by recurring structural units of the formula (VI):

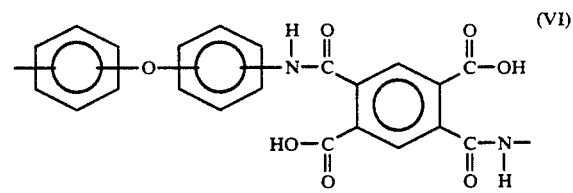

and has at the polymer terminal the amino radical derived from diaminodiphenyl ether. Successively, dicarboxylic acid anhydride is added to the polyamic acid solution and the reaction is continued to block the terminal amino radical with a dicarboxylic acid anhydride. Thereafter, the blocked polyamic acid is thermally or chemically imidized to obtain the desired polyimide.

In an alternative process, diaminodiphenyl ether, pyromellitic dianhydride and dicarboxylic acid anhydride are suspended or dissolved in an organic solvent and successively heated to carry out formation and imidization of polyamic acid at the same time. Thus polyimide can also be obtained which is blocked at the polymer terminal with a dicarboxylic acid anhydride and has the fundamental skeleton represented by recurring structural units of the above formula (IV).

In melt-processing the polyimide of the invention, a suitable amount of other thermoplastic resins can also be blended depending upon the use unless impairing the object of the invention. Other thermoplastic resins which can be blended include, for example, polyethylene, polypropylene, polycarbonate, polyarylate, polyamide, polysulfone, polyether sulfone, polyether ketone, polyphenylene sulfide, polyamidimide, polyetherimide and modified polyphenylene oxide.

Fillers which are commonly used for thermoplastic resin compositions can also be used as long as imparting no adverse effect on the object of the invention. Exemplary fillers include, graphite, carborundum, silica powder, molybdenum disulfide, fluoro resin and other abrasion resistance improvers; glass fiber, carbon fiber, boron fiber, silicon carbide base fiber, carbon whisker, asbestos, metallic fiber, ceramic fiber and other reinforcements; antimony trioxide, magnesium carbonate, calcium carbonate and other flame retardants; clay, mica and other electrical property improvers; asbestos, silica, graphite and other tracking resistance improvers; barium sulfate, silica, calcium metasilicate and other acid resistance improvers; iron powder, zinc powder, aluminum powder, copper powder and other thermal conductivity improvers; and other miscellaneous materials such as glass beads, glass spheres, talc, diatomaceous earth, alumina, silicate balloons, hydrated alumina, metal oxides and coloring materials.

The present invention will hereinafter be illustrated in detail by way of examples and comparative examples.

EXAMPLE 1

To a reaction vessel equipped with a stirrer, reflux condenser, water separator and a nitrogen inlet tube, 120.1 g (0.6 mole) of 4,4'-diaminodiphenyl ether and 898.0 g of N,N-dimethylacetamide were charged. To the resulting solution, 124.3 g (0.57 mole) of pyromellitic dianhydride was added by portion at the room temperature in a nitrogen atmosphere with caution to prevent the temperature rise of the solution and stirred for 10 hours at room temperature. Polyamic acid thus obtained had an inherent viscosity of 0.85 dl/g. The inherent viscosity was measured at 35° C. in a N,N-dimethylacetamide solution containing 0.5 g of the polyamic acid in 100 ml of the solvent. To the polyamic acid solution thus obtained, 8.88 g (0.06 mole) of phthalic anhydride was further added and stirred for 4 hours.

A part of the resultant polyamic acid solution was cast on a glass plate and heated at each of 100° C., 200° C., and 300° C., for an hour, respectively. An yellow transparent polyimide film having a thickness of 50 μm was obtained. The film had a tensile strength of 21.0 kg/mm² and elongation of 64% according to ASTM D-882.

The polyimide film thus obtained was allowed to stand at 250° C. in a hot air oven. Tensile strength and elongation were measured after 24 and 48 hours. Results are illustrated in Table 1 together with the tensile strength and elongation of the film before testing.

COMPARATIVE EXAMPLE 1

A polyamic acid solution is obtained by carrying out the same procedures as described in Example 1 except that reaction of phthalic anhydride was omitted. The polyamic acid had an inherent viscosity of 0.84 dl/g. A part of the polyamic acid solution was cast by the same procedures as Example 1 to obtain an yellow brown transparent polyimide film having a thickness of 50 μm.

Tensile strength and elongation of the polyimide film thus obtained and those of the film after allowing to stand for 24 and 48 hours at 350° C. in air are summarized in Table 1.

EXAMPLE 2

To 575.6 g of the polyamic acid solution obtained after addition of phthalic anhydride in Example 1, 121.2 g (1.2 mole) of triethylamine and 183.6 g (1.8 mole) of acetic anhydride were added dropwise. After an hour from the end of dropwise addition, yellow polyimide powder was precipitated. After stirring at the room temperature for a further 10 hours, the precipitate was filtered, dispersed in methanol and filtered again, and dried at 180° C. for 4 hours to obtain 104 g of polyimide powder.

A part of the polyimide powder thus obtained was used to measure time-dependent variation of weight loss ratio at 350° C. in air. Results are illustrated in FIG. 1. The polyimide powder caused no variation of weight after heating at 350° C. for 2 hours in air.

COMPARATIVE EXAMPLE 2

The same procedures as described in Example 2 were carried out by using 571.2 g of the polyamic acid solution obtained in Comparative Example 1. Polyimide powder thus obtained was 103 g. Time dependent variation of weight loss ratio of the polyimide powder was measured at 350° C. in air. Results are illustrated in FIG. 1 together with the results of Example 2. As illustrated in FIG. 1, the polyimide powder obtained in Example 2 is thermally more stable than the polyimide powder obtained in Comparative Example 2.

EXAMPLE 3

To a reaction vessel equipped with a stirrer, reflux condenser, water separator and a nitrogen inlet tube, 120.1 g (0.6 mole) of 4,4'-diaminodiphenyl ether, 898.0 g of m-cresol, 124.3 g (0.57 mole) of pyromellitic dianhydride and 22.2 g (0.09 mole) of phthalic anhydride were charged. The mixture was heated from room temperature to 200° C. under nitrogen stream while distilling out water formed by imidization. In the course of temperature rise, yellow polyimide powder was separated at 120° C. The reaction was carried out at 200° C. for 4 h ours. After finishing the reaction, the reaction mixture was cooled to the room temperature and poured into 5000 g of methyl ethyl ketone. The precipitated polyimide powder was filtered, washed with 3000 g of methyl ethyl ketone and dried at 250° C. for 4 hours. By using 258 g of the polyimide powder thus obtained, time dependent variation of weight loss ratio was measured at 350° C. in the air. The results were quite the same as obtained in Example 2.

TABLE 1

| | Polyimide film | | | |
|---|---|---|---|---|
| | Example 1 | | Comparative Example 1 | |
| | Tensile strength (kg/mm²) | Elongation (%) | Tensile strength (kg/mm²) | Elongation (%) |
| Original | 21.0 | 64 | 21.0 | 65 |
| After heating at 350° C. in the air | | | | |
| 24 hours | 19.0 | 55 | 12.6 | 8.5 |
| 48 hours | 16.5 | 49 | 5.7 | 4.0 |

What is claimed is:

1. A process of preparing a thermally stable melt processable polyimide comprising reacting 1 mole of a diamine compound represented by the formula (I):

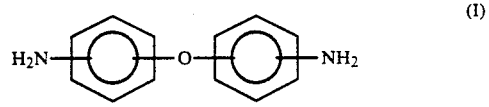

with from 0.9 to 1.0 mole of tetracarboxylic acid dianhydride of the formula (II):

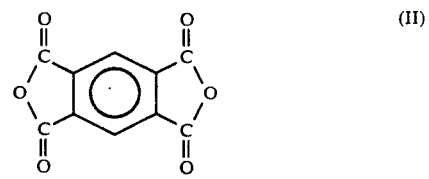

in the presence of from 0.001 to 1.0 mole of a dicarboxylic acid anhydride represented by the formula (III):

wherein Z is a divalent radical selected from the group consisting of monoaromatic radical which is substantially unsubstituted or substituted with a radical having no reactivity with amine or dicarboxylic acid anhydride and has from 6 to 15 carbon atoms, a condensed polyaromatic radical or a noncondensed aromatic radical connected each with a direct bond or a bridge member, to obtain a thermally stable polyimide having a fundamental skeleton represented by recurring structural units of the formula (IV):

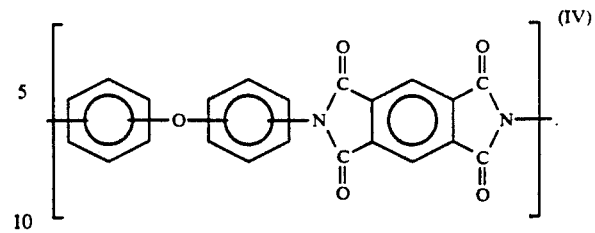

2. The process of claim 1 wherein the dicarboxylic acid anhydride is phthalic anhydride.